April 19, 1960

F. D. WILSON 2,933,057

FURNACE WITH DUMPING HEARTH

Filed Jan. 20, 1958

INVENTOR.
Francis D. Wilson
BY
ATTORNEY

April 19, 1960   F. D. WILSON   2,933,057
FURNACE WITH DUMPING HEARTH
Filed Jan. 20, 1958   3 Sheets-Sheet 2

INVENTOR.
Francis D. Wilson
BY
ATTORNEY

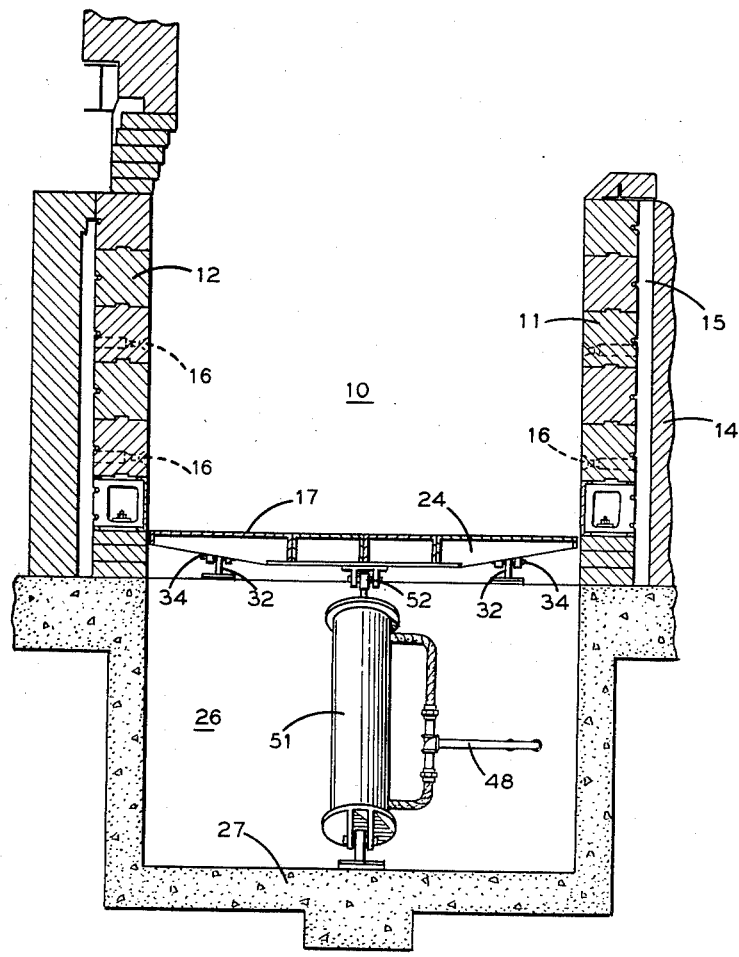

United States Patent Office 2,933,057
Patented Apr. 19, 1960

2,933,057

FURNACE WITH DUMPING HEARTH

Francis D. Wilson, Darien, Conn., assignor to The Babcock & Wilcox Company, New York, N.Y., a corporation of New Jersey Application January 20, 1958, Serial No. 709,925

3 Claims. (Cl. 110—7)

The present invention relates to fuel burning apparatus, and more particularly to a fuel burning furnace having a tilting grate or hearth for the combustion of moist fuels, such as bagasse.

One of the most popular types of furnace for the combustion of bagasse is the so-called cell type wherein the bagasse is discharged into a furnace to be burned in situ on a hearth or grate. Combustion air is supplied to the furnace through rows of air injection nozzles positioned in the walls of the cell and directed so as to impact upon the mass of bagasse reposing on the hearth. Sufficient air is passed upwardly through the hearth to afford a means for cooling the hearth and the non-combustible residue of the bagasse.

During the combustion of the bagasse, an incombustible residue is deposited upon the hearth and must be periodically removed for best operation of the cell. As disclosed in U.S. Patent 2,694,371, the hearth may be constructed to be tilted about a transverse horizontal axis so as to discharge the non-combustible residue from the hearth onto a sill, or shelf, adjacent a clean-out door in one wall of the cell. The object of the tilting hearth is to reduce the time necessary for removal of the non-combustible residue so as to avoid infiltration of air to cool the combustion gases, as such air is introduced through open doors providing access to the mass of non-combustibles to be removed from the furnace.

In accordance with the present invention, a bagasse burning furnace having a tilting hearth is constructed with a transverse horizontal axis intermediate the length of the hearth, so tilting operation of the hearth raises one portion and lowers another portion so that the non-combustible residue on the surface of the hearth may be deposited into a substantially closed dust tight ash receiving pit or chamber positioned at a lower level. The portion of the hearth which is lowered during operation of the tilting mechanism is imperforate so that little or no combustion occurs in this portion of the grate. When the hearth is in its horizontal position, the removal of the non-combustible materials from the lower ash receiving chamber may be effected with a minimum of air infiltration to the combustion zone of the furnace through the access door leading to the ash chamber.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

Fig. 3 is a front elevation, in section, taken on line 3—3 of Fig. 1.

Figure 1:
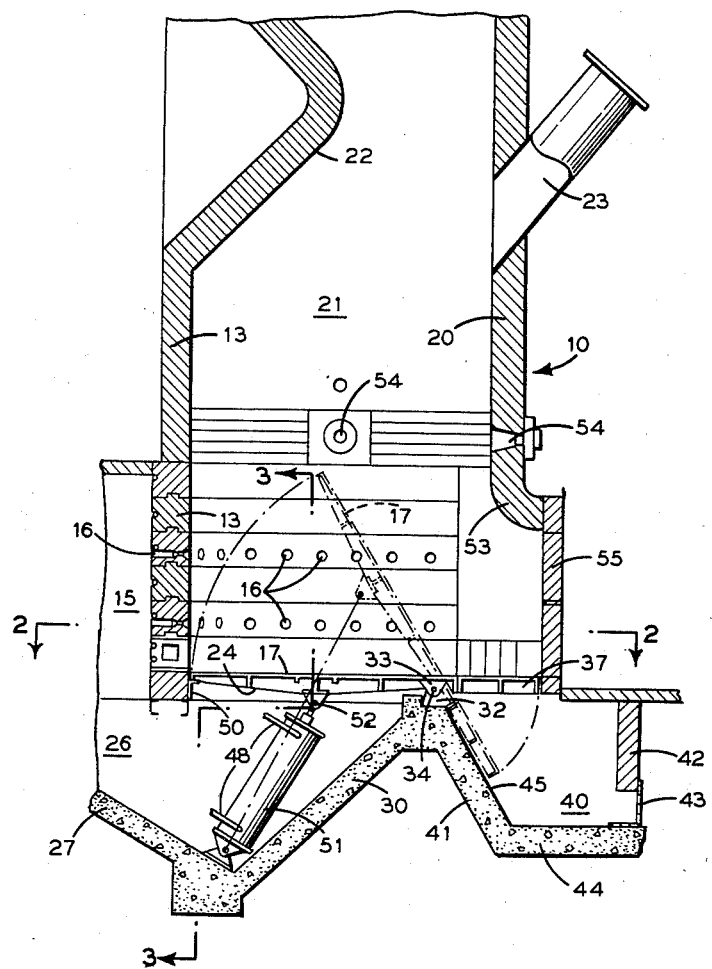
Fig. 1 is a side elevation, in section, of a bagasse furnace incorporating the tilting hearth of the present invention.

As disclosed in the drawings, the embodiment of the present invention is represented as applied to a cell type of furnace 10 arranged for the combustion of bagasse in situ. The furnace is of generally U shape in plan with the side walls 11 and 12 and rear wall 13 of the U surrounded by spaced outer walls 14 forming a plenum chamber 15 therebetween which is supplied with air under superatmospheric pressure by an external blower (not shown). The side and rear walls defining the combustion chamber 10 are provided with rows of nozzles 16 for the injection of combustion air toward the pile of bagasse maintained on the hearth 17.

In the construction shown, the furnace walls are formed by interlocked rows of refractory blocks, some of which contain the air injection nozzles 16, with the blocks conventionally maintained in position by metallic tension bars 18 of generally U shaped configuration which are attached to anchors in the front wall 20 of the furnace. Above the combustion space of the cell-like furnace, conventional refractory materials are utilized to form an upwardly extending combustion space 21 which is provided with a deflecting baffle 22 above the rear wall 13 and a bagasse feed chute 23 positioned in the front wall 20 of the furnace. The gases of combustion rising through the furnace are directed over conventional heat exchange surfaces such as steam generating tubes of a boiler (not shown).

The lower surface of the cell or furnace 10 formed by the grate or hearth 17 is assembled of metallic members or segments which are joined to provide a unitary structure. As shown particularly in Figs. 1, 2 and 3, the segments of the hearth are flanged and joined and provided with the necessary reinforcing webs or members 24 positioned on the lower side of the assembled hearth. The hearth is conveniently formed from assembled segments for ease of installation and repair, and is shaped to substantially conform in shape and dimensions with the interior surfaces of the walls defining the furnace 10. As shown particularly in Fig. 2, the active burning portion of the grate, to the left in Fig. 2, is provided with a plurality of apertures 25 for the movement of air upwardly therethrough from an air chamber 26 positioned beneath the hearth.

Figure 2:
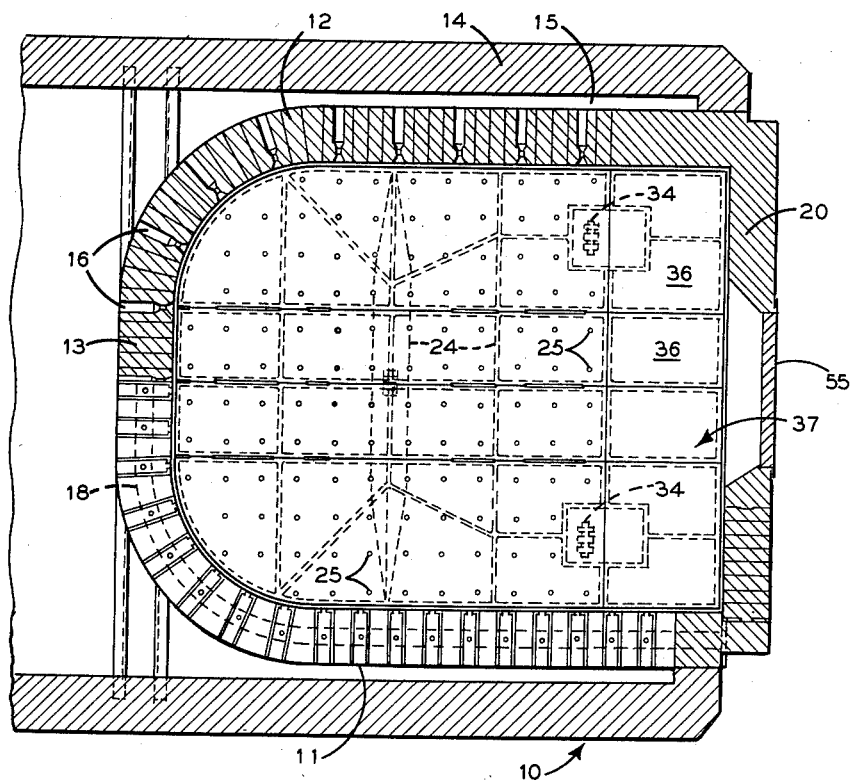
Fig. 2 is a section of the furnace taken on line 2—2 of Fig. 1.

As shown in Figs. 1 and 3, the side walls 11 and 12 of the furnace are extended downwardly below the hearth 17 to an inclined floor 27. Such side wall extensions may be of poured concrete, and cooperate with an inclined front wall 30 to define the air plenum chamber 26. The inclined floor 27 is spaced below the lower edge of the rear wall 13 of the furnace 10 so that the chamber is connected with the space 15, with combustion air moving through the chamber 26 and upwardly through the perforations 25 of the hearth 17.

The inclined front wall 30 of the chamber 26 extends upwardly to a position downwardly adjacent the lower surface of the hearth and intermediate the length thereof. This wall of the chamber 26 forms a supporting means for brackets 32 which cooperate with depending elements 33 on the hearth assembly, and connecting pins 34 to form a transverse horizontally disposed axis about which the hearth may be tilted. As hereinafter described, the hearth is tilted about the transverse horizontally disposed axis for the discharge of non-combustibles which accumulate on the hearth. The remaining portion of the hearth extending beyond the transverse axis towards the front wall 20 of the furnace is formed of imperforate segments 36 of metallic plates which are bolted together to form a grate extension 37. The grate extension 37 forms an inactive combustion portion of the furnace since substantially no combustion air is introduced into this portion of the furnace.

An ash receiving chamber 40 is positioned immediately below the hearth extension 37 and is bounded by an inclined rear wall 41, side walls (not shown), an upright front wall 42 having an ash removal door 43 therein, and a floor 44. The surface 45 of the wall 41 lies in a plane generally including the axis of tilt defined by the pins 34 so that when the extension 37 of the hearth is in its ash dumping position, the wall 41 will not interfere with the removal of ash from the hearth.

As shown particularly in Fig. 1, the front wall 20 of the bagasse burning furnace is provided with a short arch 53 which is spaced above the imperforate extension 37 of the hearth 17. At a level above the arch 53, a series of observation ports 54 are provided in the furnace walls so that the operators can observe the operations of the furnace. The front wall 20 is also provided with an access door 55, so that inspection and repairs of the furnace can be facilitated.

The portion of the hearth supporting the burning bagasse is provided with an angle support or shelf 50 extending around the edges thereof. Thus, when the hearth 17 is in its normal operating or horizontal position, the upper surface of the grate will be maintained substantially level by the supporting shelf 50 in cooperation with the mechanism forming the axis of tilt. The weight of the perforated portion 17 of the hearth is sufficient to render unnecessary any means for supporting the dead or imperforate extension 37 of the hearth. In its horizontal or burning position, the hearth closely fits the configuration of the upright U shaped wall portions of the furnace cell so that little, if any, combustion air enters the furnace to contact the mass of bagasse reposing on the hearth except through the perforations in the hearth, and through the nozzles 16 in the walls 11, 12 and 13.

As shown in Figs. 1 and 2, the tilting movement of the hearth 17 is effected by a hydraulic cylinder 51 which is pivotably supported at its lower end on the floor 27 of the chamber 26 and having the upper end of its piston pivotably attached to a toggle 52 formed substantially in the center of the perforated plate portion of the hearth. The hydraulic cylinder is supplied with motive fluid through a piping system 48 which is indicated in Figs. 1 and 3.

When the hydraulic cylinder 51 is actuated, the piston rod thereof moves the left hand or perforated portion of the hearth 17 into an upward position so that the hearth assumes a steep angle of inclination with respect to the horizontal, so that the non-combustible residues thereon will be discharged by gravity. The discharging residues are dumped into the ash receiving chamber 40 from which they may be removed.

During usual operation of the furnace described, bagasse is delivered to the furnace through the chute 23 and accumulates on the perforated plate portion of the hearth, where it burns, with combustion sustained by the air introduced through the nozzles 16 and the apertures 25. A lesser quantity of bagasse may accumulate on the imperforate plates of the hearth portion 37, but combustion thereon will not be active since combustion air is not directly applied to this portion of the furnace. Combustion of the bagasse will occur, but at a much slower rate than on the perforated portion of the hearth.

When the ash is removed from the hearth by tilting through operation of the power piston 51, the ash is discharged into the ash receiving chamber 40 where it accumulates until the hearth 17 is returned to its normal operating position. To minimize air infiltration, the ash is not removed through door 43 until the grate has been returned to its original position. Thereafter, the ash removal door 43 is opened and the ash withdrawn from the chamber for eventual disposal. Opening the ash door 43 does not adversely affect the combustion of bagasse on the hearth since little, if any, additional air will enter the furnace by reason of infiltration. An increase in the flow of air through the perforated hearth portion would only occur by reason of an increase of air differential pressure to force air through the perforations 25.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Fuel burning apparatus comprising walls defining a combustion chamber, a unitary hearth positioned in and occupying the entire lower portion of said combustion chamber, means for depositing fuel on said hearth, means for burning the fuel on said hearth including nozzles in the walls of said combustion chamber and spaced above said hearth to project combustion air into said combustion chamber, means forming separate chambers beneath said hearth including a common wall extending transversely of said hearth, means for passing air through one of said chambers and upwardly through said hearth to said combustion chamber, means for tilting said hearth about a transverse horizontally disposed axis adjacent said common wall to discharge ash residue from said hearth to the other of said chambers, including power means positioned in said air chamber and operative to tilt said hearth, the hearth portion above said other chamber being imperforate, and door means for the withdrawal of ash from said ash receiving chamber without appreciably cooling said combustion chamber.

2. Bagasse burning apparatus comprising walls defining a furnace, a hearth positioned in the lower portion of said furnace, means for depositing bagasse on said hearth, means for burning the bagasse on said hearth including air nozzles extending through the wall of said furnace positioned to project streams of combustion air toward the bagasse on said hearth, wall means beneath one portion of said hearth defining an air chamber, the hearth portion above said air chamber being perforated, means for passing air upwardly through said hearth from said air chamber to cool the hearth, wall means beneath another portion of said hearth defining an ash receiving chamber, said two wall means including a common wall portion separating the two chambers, the hearth portion above said ash receiving chamber being imperforate, and means for tilting said hearth about a horizontal axis, said axis being positioned adjacent the wall portion separating said air chamber and said ash receiving chamber whereby ash from said tilted hearth discharges into said ash receiving chamber.

3. Fuel burning apparatus comprising walls defining a combustion chamber, a unitary hearth positioned in and occupying the entire lower portion of said combustion chamber, means for depositing fuel on said hearth, means for burning the fuel on said hearth including nozzles in the walls of said combustion chamber and spaced above said hearth to project streams of combustion air into said combustion chamber, means forming separate chambers beneath said hearth including common wall means extending transversely of said hearth, means for passing air through one of said chambers and upwardly through said hearth to said combustion chamber, the hearth portion above said other chamber being imperforate, and means for tilting said hearth about a transverse horizontally disposed axis adjacent said common wall means including power means operative to tilt said hearth so as to discharge ash residue from said hearth to said other chamber.

References Cited in the file of this patent

UNITED STATES PATENTS 2,524,868 Worsham _____ Oct. 10, 1950